July 10, 1951  J. L. HOWIE, JR  2,560,291
APPARATUS FOR MOLDING THREADED ARTICLES
Filed Oct. 24, 1946  2 Sheets-Sheet 1

INVENTOR.
JOHN L. HOWIE JR.
BY
George H. Simmons

July 10, 1951          J. L. HOWIE, JR          2,560,291

APPARATUS FOR MOLDING THREADED ARTICLES

Filed Oct. 24, 1946          2 Sheets—Sheet 2

INVENTOR.
JOHN L. HOWIE JR.
BY
George H. Simmons

Patented July 10, 1951

2,560,291

UNITED STATES PATENT OFFICE 2,560,291

APPARATUS FOR MOLDING THREADED ARTICLES

John L. Howie, Jr., Decatur, Ill., assignor to The Grigoleit Company, Decatur, Ill., a corporation of Illinois Application October 24, 1946, Serial No. 705,304

2 Claims. (Cl. 18—35)

This invention relates to apparatus for manufacturing molded plastic articles containing threads and has for its principal object the provision of new and improved apparatus of this kind.

Another object of the invention is to provide apparatus for molding threads arranged to permit separation of the article from the apparatus after molding by relative translatory movement between the article and apparatus.

Still another object of the invention is to provide apparatus for molding plastic articles at low cost.

Further objects of the invention not specifically mentioned here will be apparent from the detailed description and claims which follow, reference being had to the accompanying drawings in which a preferred embodiment of the invention is shown by way of example and in which:

Figure 1:
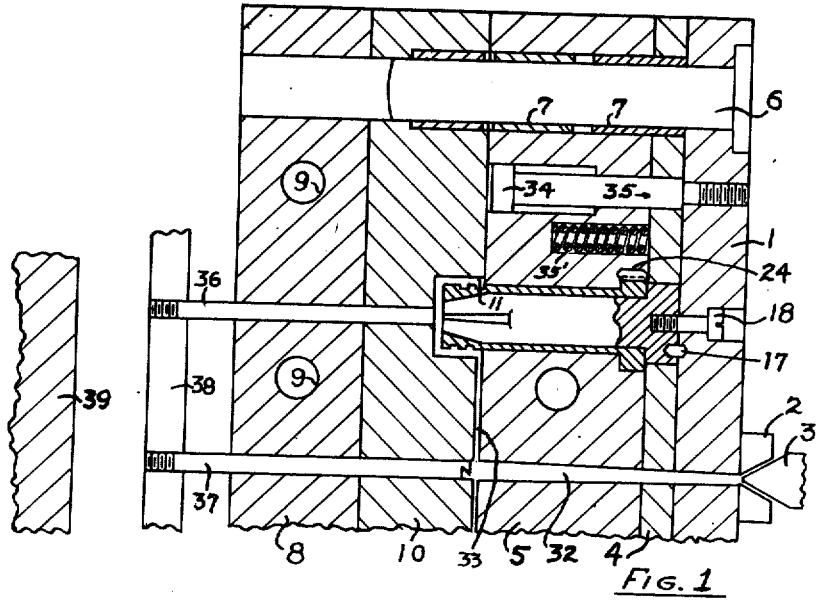
Figure 1 is a cross-sectional view through a portion of a die showing the application of the invention thereto.

In the molding of plastic articles, such as caps for bottles, collapsible tubes, jars, and the like, it has been necessary heretofore, upon the completion of the molding operation, to unscrew the finished product from the molding apparatus, or, in certain instances, to spring the product off of the thread-forming mold. This fact has tended to increase the cost of production of the articles because of the time and expense of unscrewing the finished product from the mold. Furthermore, because of this necessity to unscrew the articles, injection molding has not been feasible because of the sprues and runners which have made removal of the article from the mold increasingly difficult The present invention has for its main object the correction of this condition by providing apparatus permitting separation of the finished product from the mold by relative translatory movement. Thus, the invention enables molding low-cost articles, such as bottle caps, by the injection process as well as by compression molding.

To accomplish this object in accordance with the teachings of the present invention, the thread is interrupted at a plurality of points and the mold by which this thread is made is separated into a corresponding number of sections. These individual sections are tensioned to spring inwardly a sufficient distance so that the outside diameter of the mold in this collapsed position is less than the inside diameter of the thread section. The article and mold part can then be separated by translatory movement.

Prior to molding, a spreader is forced through the thread-forming element within the collet, this spreader spreading the sections of the collet and forcing them outwardly into cylindrical configuration. The spreader contains projections, or wings, which extend radially outwardly and which engage the adjacent edges of adjacent sections of the collet and serve to interrupt the thread as will presently appear.

The article, such as a bottle cap, formed in this manner contains of itself advantages over the corresponding articles of the prior art. Heretofore, it has been impossible to form a groove at the junction of the cylindrical sidewalls and flat endwalls of a bottle cap since it has been impossible to remove the die part over which such a groove would be formed. As a result of this, it has been necessary to limit the outside diameter of the washer by which the cap seals the bottle to a value not greater than the inside diameter of the threads, and, furthermore, it has been necessary to secure this washer in the cap by employing cement.

Caps of this kind, when composed of transparent plastic materials, of which there are a number readily available, have been made unsightly by cement and as a result transparent plastics have not come into extensive use for caps, notwithstanding their many advantages.

The present invention, since the collet and spreader are removable from the finished article without rotation of either the die parts or the article, lends itself to a further advantage. Distinctive markings, such as a trade-mark and indicia such as the manufacturer's name or the name of the article, can be formed by suitable molds carried on the end of the collet spreader and thereby molded in the closed end of the cap as either raised or depressed letters. The washers placed in the caps to seal the bottle can be composed of distinctive colored materials and when placed in the cap against these letters and other indicia will produce a pleasing appearance heretofore impossible of attainment.

Referring now to the drawings in more detail, particularly Figure 1, where the invention is shown applied to a die. As shown, the die is adapted for injection molding but it will be understood that this adaptation of the invention is shown only by way of example. The die consists of a fixed plate, one that is attached to the stationary bed of the injection molding machine by means not shown and which contains a nozzle 2 adapted to receive the injection nozzle 3 of the torpedo of that machine. Adjacent this die plate 1 is an auxiliary plate 4 containing perforations into which the base section of the collet spreaders are positioned. Adjacent the auxiliary plate 4 is a die plate 5 in which the collets are positioned, these three plates together constituting the "stationary" die. Plate 5 is provided with openings through which a cooling medium may be circulated in the usual manner. Die plate 1 carries guide pin 6 that extends through plates 4 and 5, which plates are equipped with bushings 7 that engage the pin to accurately position the plates with respect thereto.

The movable die of the assembly consists of a die bed 8 containing perforations 9 through which a cooling medium may be circulated in the usual manner. Fixed upon this bed is a die plate 10 in which is sunk the cavity 11 by which the exterior contour of the article is determined. Ordinarily, plate 10 will carry a number of cavities, only one of which is shown.

As will be seen best in Figures 2 to 5, the collet spreader contains a base 15, preferably circular, and containing a recess 16 into which a locating pin 17, Figure 1, projects to position the collet definitely with respect to the plate 1. This base 15 is threaded to receive a stud bolt 18 by which the spreader is attached to the plate 1. The spreader contains a main body 19 which is cylindrical and which at its outer end is tapered at 20 and equipped with projections 21 extending radially outwardly. These projections are themselves tapered, being narrower at the outermost end of the spreader.

Figure 2:
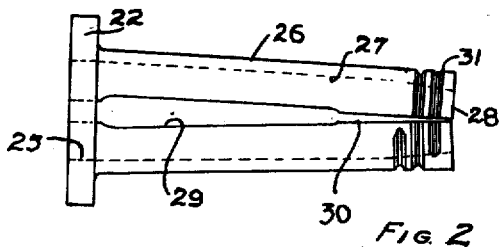
Figure 2 is an elevational view of a collet for molding internal threads.
Figure 3:
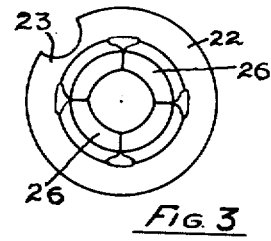
Figure 3 is an end view of the collet shown in Figure 2.
Figure 4:
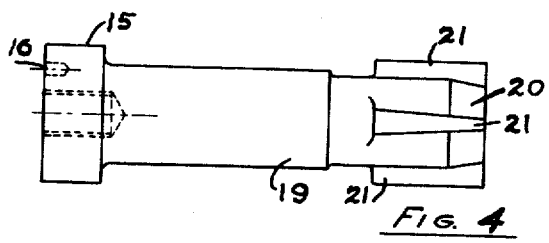
Figure 4 is an elevational view of the collet spreader for use with the collet shown in Figures 2 and 3.

The collet consists of a base 22 containing a recess 23 into which a locating pin 24 is extended to position the collet in definite position with respect to plate 5. The base 22 is formed as an annulus having a concentric opening 25 that coincides with the inside wall surface of the collet sections 26. As shown in Figures 2 and 3, there are four sections 26 in the collet but a greater or smaller number of sections may be used if desired. The inside surface 27 of the collet is cylindrical and of diameter approximating that of the body 19 of the spreader when the spreader is inserted in the collet. Near the outer end of the sections this surface 27 tapers as shown at 28 to a smaller diameter. As the spreader is inserted in the collet through opening 25, the tapered portion 20 thereof engages the tapered surface 28 to spread apart the sections of the collet. Projections 21 extend through a relatively large slot 29 during the initial part of the movement of the spreader into the collet and thereafter engage surfaces 30 to spread the collet accurately to a prescribed outside diameter. Sunk in the outer surface of the collet sections is a thread-forming mold 31 which, it will be noted, does not extend to the ends of the sections.

Figure 6:
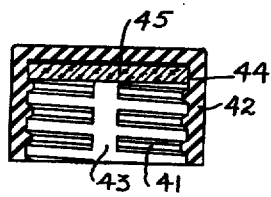
Figure 6 is a cross-sectional view through the bottle cap showing the invention.

With the die closed as shown in Figure 1, the plastic material is forced through the nozzle 3 in the sprue 32, thence through runners 33 into the die cavities, only one of which is shown in this figure. As will be seen in Figures 1 and 6 the die cavity and consequently the article, has a cylindrical side wall and a circular end wall. The thread sections formed by mold 31 project radially inwardly from the side wall and do not extend to the end wall, forming in effect a groove adjacent the end wall.

After molding has been completed the die is opened, plates 9 and 10 moving to the left during this operation. During the initial part of this movement plate 5 and with it the collet are likewise moved to the left until the head 34 of the bolt 35 that is carried by plate 1 strikes the bottom of the well in plate 5. In order to insure that there will be this relative movement between plates 4 and 5, springs such as 35' may be provided. These springs are compressed as the plates are brought together and thereby tensioned to urge the plates apart and during the initial movement on opening the die plate 5 will move under the tension of the springs. In Figure 1 only one spring 35' is shown but it will be understood that the die will be equipped with several springs as needed. By this time the collet will have moved off the spreader sufficiently far to permit the sections 26 thereof to move inwardly and thereby free the collet from the article. Continued movement of the plates 8 and 10 after the plate 5 has become stationary withdraws the article from the collet.

Carried in the plates 8 and 10 are ejector pins 36 and 37 that are connected together by suitable means 38 and adapted to force the article out of the cavity 11 in the die plate 10. When the base 38 hits a part 39 of the frame of the machine immediately prior to the final movement of the die plates 8 and 10, ejector pins 36 and 37 will move to the right relative to these plates forcing the articles out of the cavity in the obvious manner. The sprue runners and articles are then removed from the machine and the dies closed by reverse movement into the position shown in Figure 1 in readiness for the next cycle of operation. The particular arrangement shown in Figure 1 is somewhat diagrammatic and is intended merely to illustrate the operation. It will be apparent to one skilled in the art that many modifications of the specific die arrangement shown in this example can be made.

Figure 5:
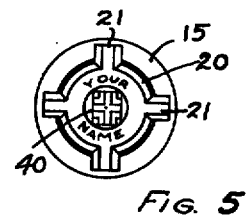
Figure 5 is an end view of the spreader shown in Figure 4.
Figure 7:
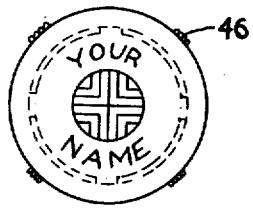
Figure 7 is a top plan view of the cap.
Figure 8:
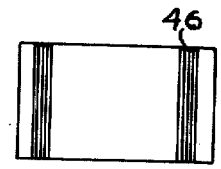
Figure 8 is a side elevational view of the cap.
Figure 9:
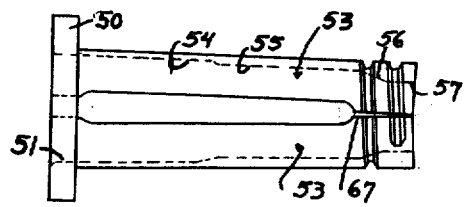
Figure 9 is a side elevational view of a modified form of collet.
Figure 10:
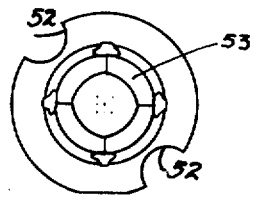
Figure 10 is an end elevational view of the collet shown in Figure 9.
Figure 11:
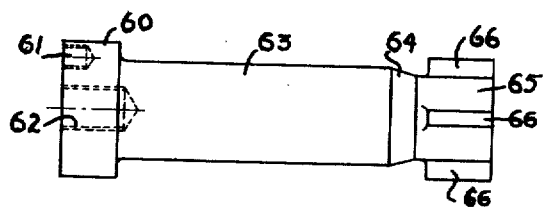
Figure 11 is an elevational view of the modified collet spreader for use with the collet shown in Figures 9 and 10.
Figure 12:
Figure 12 is an end elevational view of the collet spreader shown in Figure 11.

As will be seen in Figures 5 and 7, suitable indicia indicated by the design 40 and lettering by the legend "your name" can be formed in the flat end surface of the spreader and when so formed will mold corresponding indicia on the inner face of the end section of the article. Threads 41 project radially inwardly from the cylindrical walls 42 of the cap that is shown by way of example, these threads being divided in the four sections separated by spaces 43. Adjacent the closed end of the cap and formed by the last convolution of the thread 41 is in effect a groove 44 into which a sealing washer 45 may be placed and when so placed the washer will be held in the cap by the threads. Washers of this type vary in construction but may conveniently be composed of a resilient material such as cork faced with a suitable facing such as paper or fabric, and if desired, the face of the washer disposed against the closed end of the cap may be covered with material of a distinctive, attractive color. In the cap as shown in Figure 7, which is composed of a transparent plastic and contains indicia molded on the inside surface of its end-wall, such a distinctive coloring of the washer would enhance the appearance of the cap.

As shown, the cap contains suitable outwardly extending projections 46 to facilitate screwing and unscrewing it from a bottle or jar, the particular shape and location of these projections being for example only as they are not of the essence of the present invention.

In the collet shown in Figures 1 to 5, inclusive, the radial projections on the spreader are tapered and the surfaces of the collet sections engaged thereby are likewise tapered. In Figures 9 to 12, inclusive, a modified form of collet is illustrated. As before, the collet consists of a base 50 containing a concentric opening 51 and containing pin locating recesses 52. The body of the collet is divided into four sections 53 as before and the interior wall of these sections contains a large diameter portion 54 and a smaller diameter portion 55 and taper 56 and a smallest diameter portion 57.

The spreader consists of a base 60 containing pin recesses 61 and a threaded central opening 62 as before and the body 63 of the spreader is cylindrical and has a diameter less than the diameter of the collet wall section 54 but greater than the diameter of the wall section 55. The spreader contains a tapered portion 64 which will force apart the sections of the collet by engaging the wall sections 55 thereof. The outer portion of the spreader is cylindrical as shown at 65 and of the same diameter as the wall section 57 of the collet. Projecting radially outwardly from the section 65 of the spreader are projections 66 which it will be noted have parallel sides. The adjacent edges 67 of the collet are parallel when the collet is spread to cylindrical configuration. The operation of the collet and spreader shown in Figures 9 to 12 is identical with that of the collet shown in Figures 2 to 5 and need not be repeated herein. The end face of the spreader may contain indicia 68 if desired.

From the foregoing it will be apparent that the present invention is possessed of many advantages. It produces a new and improved article containing distinctive markings internally, impossible heretofore. It permits the use of transparent plastics for bottle caps and the like. It permits fastening the sealing washer in the article without the use of glue and permits molding threaded articles with compression or injection molding processes, and at a low cost. The apparatus of the invention can be manufactured and maintained in perfect operating condition at low cost.

While I have chosen to illustrate my invention by showing and describing a preferred embodiment of it I have done so by way of example only as there are many modifications and adaptations which can be made by one skilled in the art within the teachings of the invention.

Having thus complied with the statutes and shown and described a preferred embodiment of the invention what I consider new and desire to have protected by Letters Patent is pointed out in the appended claims.

What is claimed is:

1. In combination, a collet comprising an annular head, a plurality of arcuate members formed as sections of a hollow threaded cylinder and projecting from one face of said head with the inner surfaces of the sections aligned with the perforation in the head, tapered shoulders on said inner surfaces in juxtaposition to said head and connecting the aligned portions thereof with smaller radius portions extending towards the free ends of the members, said arcuate members being tensioned to move inwardly into abutment at their free ends; a spreader comprising a cylindrical body of the same diameter as the aligned portions of said inner surfaces, a tip portion and a tapered shoulder disposed between the body and tip portions, projections on said tip portion extending from the free end thereof to said shoulder and radially outwardly to arcs of the same radius as the outer surfaces of said arcuate members, said spreader on moving longitudinally engaging said spreader shoulder with said section shoulders to force said sections outwardly and thereafter to move said projections into engagement with the adjacent edges at the free ends of said arcuate members.

2. In a mold for forming interrupted internal threads in an article comprising: a collet comprising an annular base, arcuate sections projecting from said base and forming between them a hollow cylinder threaded at its free end, said sections being spaced apart circumferentially of the collet with the edges of the sections forming slots which have narrow portions coinciding with the threaded portion of the collet, a tapered shoulder on the inner surface of the collet in juxtaposition to said base and connecting a larger radius base surface with a smaller radius portion extending towards the free end of the collet, a second tapered shoulder on said inner surface adjacent the free end of the collet and connecting said smaller radius surface with a still smaller radius tip portion, said collet sections being tensioned to move inwardly so that they abut together at the free end of the collet; a spreader comprising a cylindrical body having sliding fit with the base internal surface of the collet and a tip cylindrical portion having sliding fit with the smallest radius tip portion of the collet, a tapered shoulder on the spreader connecting the body and tip portions and moved into engagement with said first collet shoulder as the spreader is moved longitudinally into the collet to spread the sections of the collet into cylindrical form, and projections on the tip of the spreader moved by further longitudinal movement into engagement with said edges of the narrow portions of the slots in the collet to complete the mold.

JOHN L. HOWIE, JR.

REFERENCES CITED

The following references are of record in the file of this patent:

UNITED STATES PATENTS

| Number | Name | Date |
|---|---|---|
| 8,547 | Newton | Nov. 25, 1851 |
| 291,072 | Murphy | Jan. 1, 1884 |
| 306,146 | Gray | Oct. 7, 1884 |
| 913,212 | Johnson | Feb. 23, 1909 |
| 1,351,496 | Spooner | Aug. 31, 1920 |
| 1,817,912 | Behrendt | Aug. 11, 1931 |
| 1,916,693 | Scribner | July 4, 1933 |
| 2,039,757 | Von Till | May 5, 1936 |
| 2,131,319 | Greenholtz | Sept. 27, 1938 |
| 2,168,594 | Von Till | Aug. 8, 1939 |
| 2,171,015 | Webb | Aug. 29, 1939 |
| 2,327,665 | Peat | Aug. 24, 1943 |